(12) United States Patent
Sugita et al.

(10) Patent No.: US 6,866,956 B2
(45) Date of Patent: Mar. 15, 2005

(54) FUEL CELL

(75) Inventors: Narutoshi Sugita, Utsunomiya (JP); Seiji Sugiura, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 356 days.

(21) Appl. No.: 10/236,307

(22) Filed: Sep. 6, 2002

(65) Prior Publication Data

US 2003/0049507 A1 Mar. 13, 2003

(30) Foreign Application Priority Data

Sep. 7, 2001 (JP) .......................................... 2001-272640

(51) Int. Cl.⁷ .............................................. H01M 8/04
(52) U.S. Cl. .............................. 429/26; 429/35; 429/39
(58) Field of Search .............................. 429/26, 35, 39

(56) References Cited

U.S. PATENT DOCUMENTS 6,420,061 B1 * 7/2002 Fujii et al. ...................... 429/26
2002/0192522 A1 * 12/2002 Wada et al. .................... 429/26
2003/0054216 A1 * 3/2003 Sugita et al. ................... 429/26

* cited by examiner

Primary Examiner—John S. Maples
(74) Attorney, Agent, or Firm—Anthony A. Laurentano; Lahive & Cockfield, LLP (57) ABSTRACT

A fuel cell is reduced in size and weight while the respective communication passages are reliably sealed by the respective sealing members between separators and an electrode assembly. Separators of a fuel cell is provided with communication holes for a reaction gas and cooling medium provided in the outer side of gas sealing members, and with a communication passage that detours around the gas sealing members in the thickness direction of the separators and connects gas communication passages with the reaction gas communication hole. A cooling surface sealing member that seals off the cooling medium communication passage from the reaction gas communication hole is located at a position that is shifted from the communicating passage towards the communication hole side.

12 Claims, 10 Drawing Sheets

FUEL CELL

BACKGROUND OF THE INVENTION

1. Field of the Invention

The present invention relates to a fuel cell formed by stacking a plurality of fuel cell units that are formed by sandwiching an electrode assembly between separators.

2. Description of the Related Art

There is one type of fuel cell unit that is formed in a plate shape by sandwiching between a pair of separators an electrode assembly that is formed by placing an anode electrode and a cathode electrode respectively on either side of a solid polymer electrolyte membrane. A fuel cell is formed by stacking a plurality of fuel cell units that are structured in this way in the thickness direction of the fuel cell units.

In each fuel cell unit, there are provided a communication passage for fuel gas (for example, hydrogen) on one surface of the anode side separator that is located facing the anode electrode, and a communication passage for oxidizing gas (for example, air that contains oxygen) on one surface of the cathode side separator that is located facing the cathode electrode. In addition, a communication passage for a cooling medium (for example, pure water) is provided between adjacent separators of adjacent fuel cell units.

When fuel gas is supplied to the electrode reaction surface of the anode electrode, hydrogen is ionized at the electrode reaction surface and moves to the cathode electrode via the solid polymer electrolyte membrane. Generated electrons are extracted to an external circuit and used as direct current electrical energy. Because oxidizing gas is supplied to the cathode electrode, hydrogen ions, electrons, and oxygen react to generate water. Because heat is generated when water is created at the electrode reaction surface, the electrode reaction surface is cooled by a cooling medium made to communicate between the separators.

The fuel gas, oxidizing gas (generically known as reaction gas), and the cooling medium each need to travel through a separate communication passage. Therefore, sealing technology that keeps each communication passage sealed in a fluid-tight or airtight condition is essential.

Examples of portions that need to be sealed are: the peripheries of penetrating supply holes formed in order to supply and distribute reaction gas and cooling medium to each fuel cell unit of the fuel cell; the peripheries of discharge holes that collect and discharge the reaction gas and cooling medium that are discharged from each fuel cell unit; the outer peripheries of the electrode assemblies; and the outer peripheries and the like of the areas between the separators of adjacent fuel cell units. A material that is soft yet also has the appropriate resiliency such as organic rubber is employed for the sealing member.

In recent years, however, size and weight reduction as well as a lowering in the cost of fuel cells have become the main aims expected to lead to the more widespread application of fuel cells through their being mounted in actual vehicles.

Methods that have been considered for reducing the size of a fuel cell include making each fuel cell unit forming the fuel cell thinner, more specifically, reducing the size of the dimension between separators while maintaining a maximum size for the reaction gas communication passage formed inside each fuel cell unit; and also making the separators thinner.

However, a limit is imposed on how thin the separators can be made by the strength requirements for each separator and by the rigidity requirements for the fuel cell. Moreover, reducing the height of the sealing member is effective in reducing the size of the dimension between separators, however, the height of the sealing member needs to be sufficient for the sealing member to be able to secure a sufficient crushed margin in order to ensure the required sealing ability is obtained. Therefore, there is also a limit to how much the height of the sealing member can be reduced.

Furthermore, in a fuel cell unit, although the space occupied by the sealing members is indispensable for the reaction gas and cooling medium to be sealed in, because this space contributes substantially nothing to power generation it needs to be made as small as possible.

Figure 24:
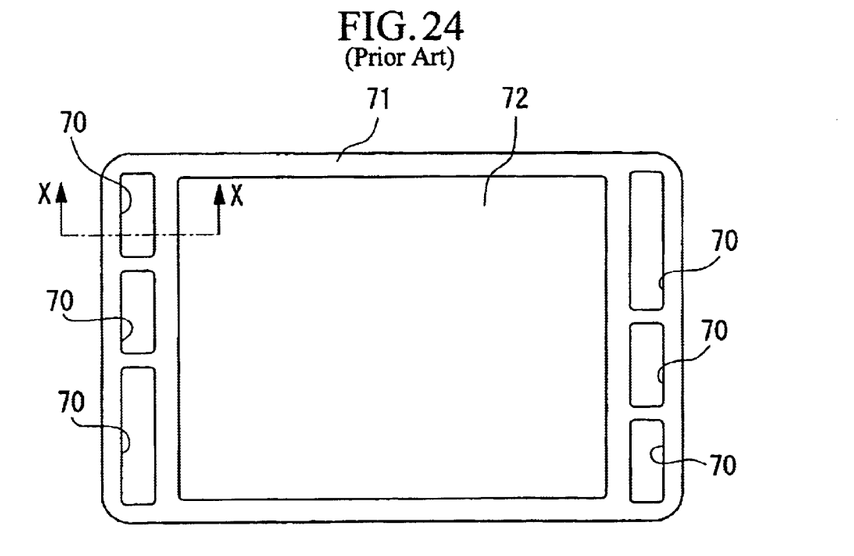
FIG. 24 is a plan view schematically showing a fuel cell unit in a conventional fuel cell.

FIG. 24 is a plan view showing a conventional fuel cell. In FIG. 24 the symbol 70 indicates a communication hole such as a fuel gas supply hole and discharge hole, an oxidizing gas supply hole and discharge hole, and a cooling medium supply hole and discharge hole that each penetrate the fuel cell in the direction in which separators 71 are stacked. The symbol 72 indicates an area formed by a plurality of fuel gas communication passages, oxidizing gas communication passages, and cooling medium communication passages running along the separators 71.

Figure 25:
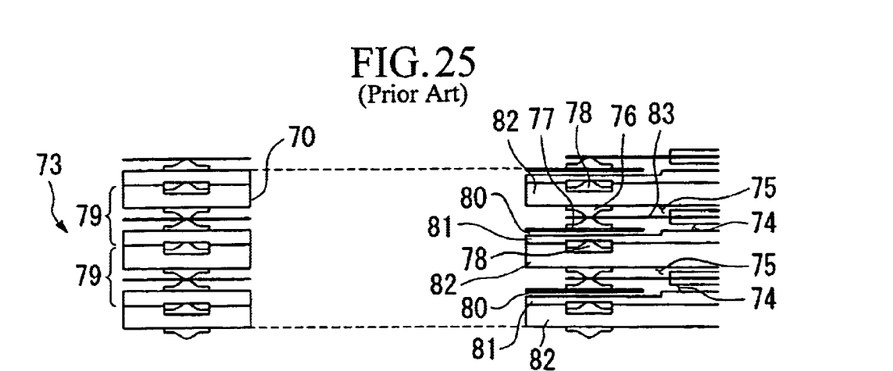
FIG. 25 is a vertical cross-sectional view showing the vicinity of a communication hole in the fuel cell shown in FIG. 24 taken along the line X—X.

FIG. 25 is a vertical cross-sectional view of a conventional fuel cell 73 taken along the line X—X in FIG. 24. As can be seen in plan view, in order to make the space occupied by the sealing member (which doesn't contribute to power generation) as small as possible, conventionally, by locating gas sealing members 76 and 77, which respectively seal a fuel gas communication passage 74 and an oxidizing gas communication passage 75, together with a cooling surface sealing member 78, which seals a cooling medium communication passage, in a row in the stacking direction of the fuel cell unit 79, the outer dimensions of the fuel cell 73 are kept to a minimum.

However, the drawback with the fuel cell 73 that is structured in this manner is that if the gas sealing members 76 and 77 that seal the communication passages 74 and 75 as well as the cooling surface sealing member 78 are all placed in a row in the stacking direction of the fuel cell unit 79, then the thickness of the fuel cell 73 cannot be made less than a value obtained by adding the height of the cooling surface sealing member 78 between fuel cell units 79 to the thickness of each fuel cell unit 79, and multiplying this result by the number of fuel cell units stacked in the fuel cell.

More specifically, as shown in FIG. 25, the fuel gas supply hole 70 and the fuel gas communication passage 74 that are isolated in a sealed state by gas sealing members 76 and 77 are connected by a communication passage 80. The communication passage 80 is provided in the separator 81 so as to detour around, in the thickness direction of the separator 81, the vicinity of the fuel gas supply hole 70 of the gas sealing member 77 that seals the entire periphery of the fuel gas communication passage 74. Moreover, the separator 82 also has a similar communication passage (not shown) in the oxidizing gas supply hole (not shown).

Accordingly, each of the separators 81 and 82 are formed comparatively thickly in order to form the communication passage 80, however, as is seen in the cross section in FIG. 25, at the position of the seal line where each of the sealing members 76 to 78 are placed, the separators 81 and 82 are formed with the minimum thickness needed to ensure the required strength, and it is not possible to make them any thinner.

Moreover, because each of the sealing members 76 to 78 are formed with the minimum height needed to ensure sealing ability, it is not possible to reduce the height of the sealing members 76 to 78 any further.

As a result, although the thickness of the fuel cell 73 is found by multiplying the number of stacks of fuel cell units by the sum of the minimum thickness of the two separators 81 and 82, the thickness needed to form the communication passage 80, the height of the two gas sealing members 76 and 77, the thickness of the solid polymer electrolyte membrane 83, and the height of the cooling surface sealing member 78, because these are all indispensable it is extremely difficult to achieve any further reduction in the thickness of the fuel cell 73.

SUMMARY OF THE INVENTION

The present invention was conceived in view of the above circumstances, and it is an object thereof to provide a fuel cell that has been made lighter and smaller by reducing the thickness thereof, while reliably sealing the respective communication passages using the respective sealing members between the separators and the electrode assemblies that form the fuel cell.

In order to achieve the above object, the present invention proposes the following apparatus. The present invention proposes a fuel cell formed by stacking a plurality of fuel cell units such that the fuel cell units sandwich cooling surface sealing members that seal a cooling medium communication passage formed between the fuel cell units, each fuel cell units comprising: an electrode assembly formed by disposing electrodes on both sides of an electrolyte; a pair of separators that sandwich the electrode assembly in the thickness direction thereof; and a gas sealing member that is disposed at an outer peripheral portion of the electrode assembly, and that seals respective gas communication passages for reaction gases (namely, fuel gas and oxidizing gas) that are formed between each separator and the electrode assembly and are bounded by the separators and the electrode assembly, wherein in each of the separators there are provided communication holes (for example, the fuel gas supply hole 17, the oxidizing gas supply hole 18, the cooling medium supply hole 19, the fuel gas discharge hole 20, the oxidizing gas discharge hole 21, and the cooling medium discharge hole 22 in the embodiments) for the reaction gases and the cooling medium that penetrate the separators in the thickness direction thereof to the outer side of the gas sealing member, and a communication passage that detours around the gas sealing member in the thickness direction of the separators and connect the reaction gas communication hole with the gas communication passage; and the cooling surface sealing member that seals off the cooling medium communication passage from the reaction gas communication hole is provided at a position that is shifted from the communication passage towards the communication hole.

According to the fuel cell of the invention, because the gas communication passage and the communication hole provided in a separator are connected by a communicating passage that detours around the gas sealing member in the thickness direction of the separator, it is necessary to ensure that the height of the communication passage and the minimum thickness required in the separator are secured at the position of the gas sealing member. However, because the cooling surface sealing member that seals the cooling medium communication passage is located at a position that is shifted from the communication passage towards the communication hole side, it is possible to fix the position of the cooling surface sealing member in the stacking direction without taking into account the communication passage provided in the vicinity of the gas sealing member.

As a result, it is possible to overlap the position of the cooling surface sealing member with the position of the communication passage in the stacking direction of the fuel cell units, and the thickness of each fuel cell unit can be decreased by the size of this overlapping portion. Because as many as several hundred fuel cell units may be stacked in a fuel cell, it is possible to achieve a marked size reduction in the fuel cell as a whole in accordance with how many fuel cell units, each of whose thickness has been reduced, are stacked.

In the present invention, in areas other than the vicinity of the communication passage, the cooling surface sealing member may be placed at substantially the same position as the gas sealing member as seen from a stacking direction.

With such a structure, in the vicinity of the communication passage that is formed so as to detour around the gas sealing member in the thickness direction thereof, the separator needs to be made thicker by the amount of the height of the communication passage. Therefore, the cooling surface sealing member is shifted towards the communication hole side, thereby avoiding placing the gas sealing member on the same seal line as the cooling surface sealing member. In areas other than the vicinity of the communication passage, by placing the gas sealing member and the cooling surface sealing member aligned in a row in the stacking direction of the fuel cell units, it is possible to reduce the surface are of the fuel cell units. Moreover, by shifting the seal line in the vicinity of the communication hole, in the same way as in the fuel cell according to the above structure, the cooling surface sealing member and the communication passage can be placed in overlapping positions in the stacking direction, and the thickness of the fuel cell can be reduced by placing the cooling surface sealing member and the gas sealing member closer together in the stacking direction.

In the present invention, each communication passage may be provided with a plurality of grooves formed on one surface of a separator and a flat bridge plate that extends right across the grooves.

In the present invention, a concave section into which the bridge plate is fitted may be formed on the surface of the separator where the bridge plate is placed, and the surface of the bridge plate is placed within the same planar surface as a planar section of the separator with no difference in level.

In the present invention, the bridge plate may be placed at a superposed position with respect to the gas sealing member.

In the present invention, the cooling medium communication passage may be provided for each fuel cell unit. With such a structure, it is possible to achieve a cost reduction by reducing the quantity of the cooling surface sealing member.

In the present invention, each cooling medium communication passage may be provided for a plurality of fuel cell units. With such a structure, it becomes possible to reduce the height of the fuel cell even further.

In the present invention, a single separator may be provided in each space between the fuel cell units where the cooling medium communication passage is not formed.

In the present invention, the gas sealing member may be provided with an inner side sealing section that seals the space between the electrolyte and the separator provided on one surface of the electrolyte, and with an outer side sealing section that is located on the outer side of the electrolyte and seals the space between the pair of separators.

Additionally, in the present invention, the inner side sealing section and the outer side sealing section may be provided on one side of the electrolyte.

With such structures, not only is it possible to reliably seal the gas communication passages formed on both sides of the electrolyte, but also it is possible to reduce the space occupied by the gas sealing member and lower the height of the fuel cell.

In the present invention, the electrode assembly may be a stepped electrode assembly in which one electrode is made larger than the other electrode, and one entire surface of the electrolyte is covered by the one electrode.

In the present invention, each separator may be formed in a corrugated shape by press working a thin metal plate.

DETAILED DESCRIPTION OF THE PREFERRED EMBODIMENTS

The fuel cell 1 according to the first embodiment of the present invention will now be described with reference to the drawings.

Figure 1:
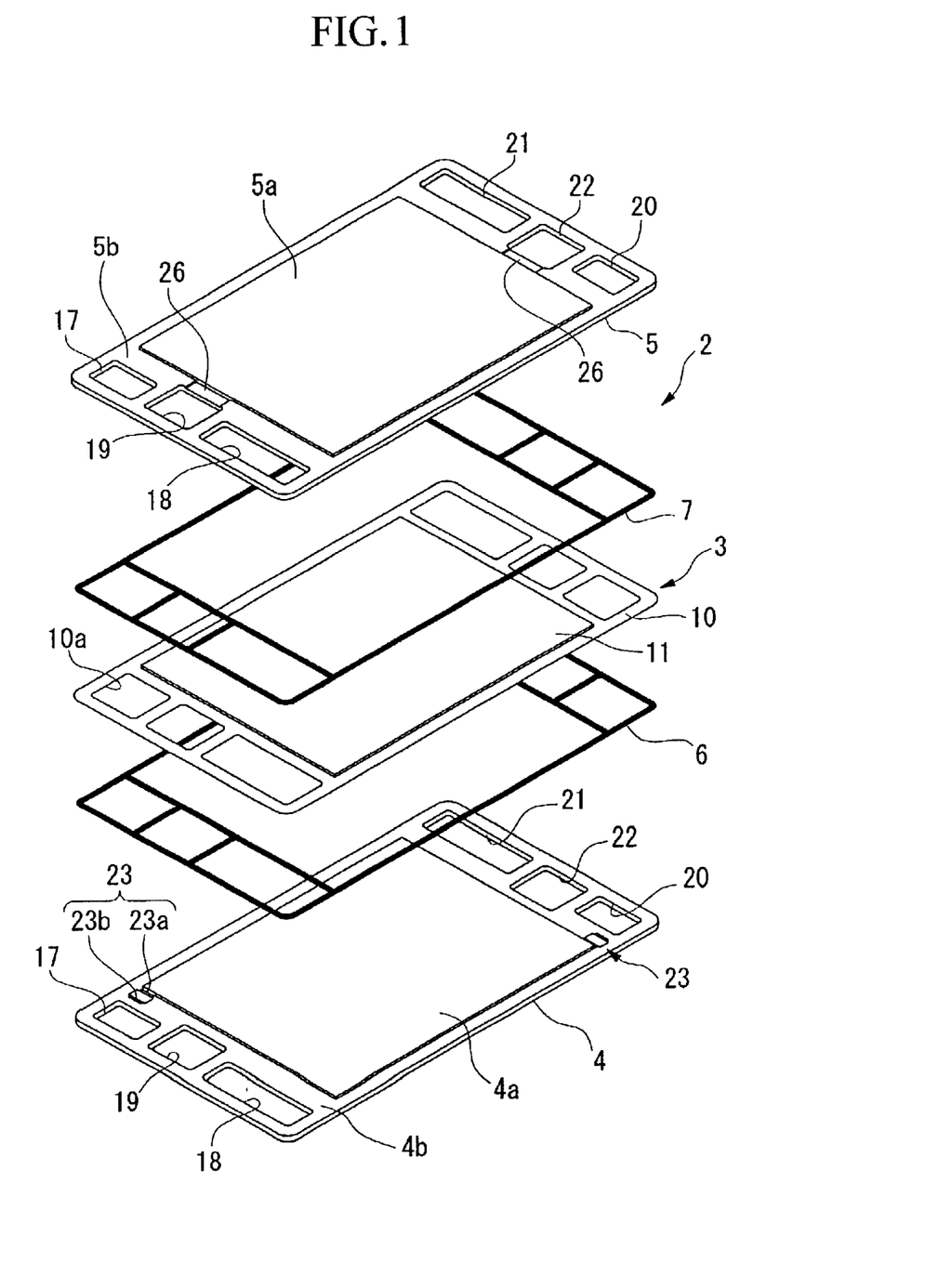
FIG. 1 is an exploded perspective view showing in typical view a fuel cell unit forming the fuel cell according to the first embodiment of the present invention.
Figure 12:
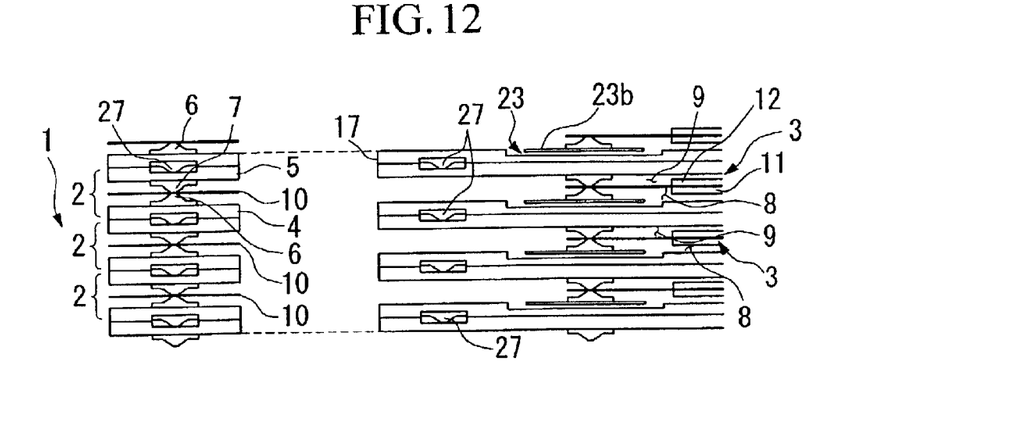
FIG. 12 is a vertical cross-section taken along the line A—A in FIG. 7 showing the fuel cell shown in FIG. 1.

As is shown in FIG. 12, the fuel cell 1 according to the present embodiment is formed by stacking a plurality of fuel cell units 2. As is shown in FIG. 1, a fuel cell unit 2 is formed by sandwiching an electrode assembly 3 between a pair of separators 4 and 5. Between the electrode assembly 3 and each of the separators 4 and 5 are disposed respectively gas sealing members 6 and 7. As is shown in FIG. 12, these gas sealing members 6 and 7 delimit the fuel gas communication passage 8 and the oxidizing gas communication passage 9 so as to seal them on either side of the electrode assembly 3.

Figure 2:
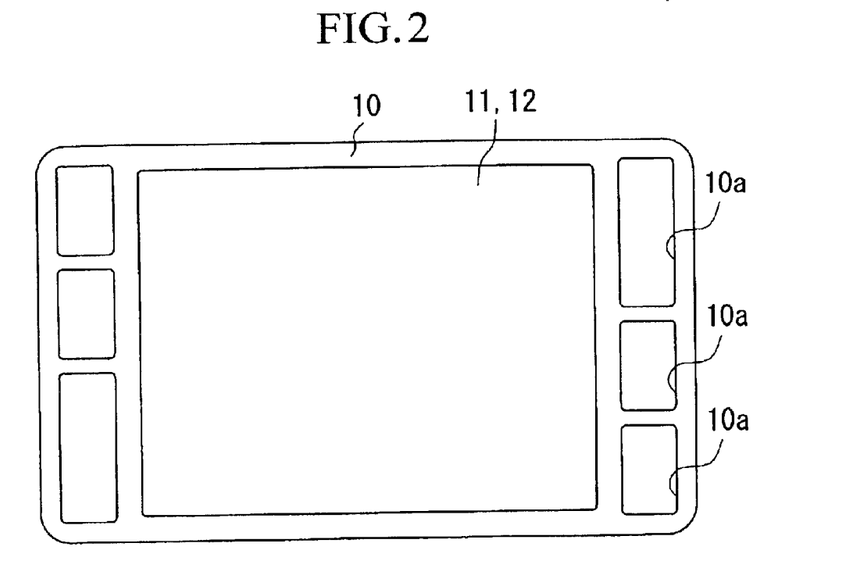
FIG. 2 is a plan view showing the electrode assembly forming the fuel cell unit shown in FIG. 1.

As is shown in FIGS. 2 and 12, the electrode assembly 3 has, for example, a solid polymer electrolyte membrane 10 (referred to below simply as an electrolyte membrane) formed from a perfluorosulfonic acid polymer, and an anode electrode 11 and cathode electrode 12 that sandwich the electrolyte membrane 10.

As is shown in FIG. 2, for example, the electrolyte membrane 10 has a plurality of through holes 10a. The electrolyte membrane 10 is the equivalent size to the separators 4 and 5 that are described below, and each of the through holes 10a is placed at a position that corresponds to one of the supply holes 17 to 19 and discharge holes 20 to 22 in the separators 4 and 5.

The anode electrode 11 and the cathode electrode 12 are formed, for example, by disposing a catalyst layer, formed from an alloy having Pt as the main element, on one surface thereof that is contact with the electrolyte membrane 10, using a gas diffusion layer formed by porous carbon cloth or porous carbon paper as the base material.

Two types of separator 4 and 5 are used for the separators 4 and 5 that form the fuel cell units 2. As is shown in FIGS. 3 and 4, each of the separators 4 and 5 is formed from: corrugated sections 4a and 5a made up of a plurality of indentations and bumps that have a fixed height and are formed in a fixed pattern by forming a plurality of grooves 13 to 16 (see FIG. 15) in a surface of a flat plate made from carbon; a fuel gas supply hole (communication hole) 17, an oxidizing gas supply hole (communication hole) 18, a cooling medium supply hole (communication hole) 19, a fuel gas discharge hole (communication hole) 20, an oxidizing gas discharge hole (communication hole) 21, and a cooling medium discharge hole (communication hole) 22 that each penetrate the two separators 4 and 5 so as to make possible both the supply and discharge of fuel gas (for example, hydrogen gas), oxidizing gas (for example, air that contains oxygen), and cooling medium (for example, pure water) respectively that are made to flow through the corrugated sections 4a and 5a; and planar sections 4b and 5b that are disposed so as to surround each of the supply holes 17 to 19, the discharge holes 20 to 22, and the corrugated sections 4a and 5a.

Figure 3:
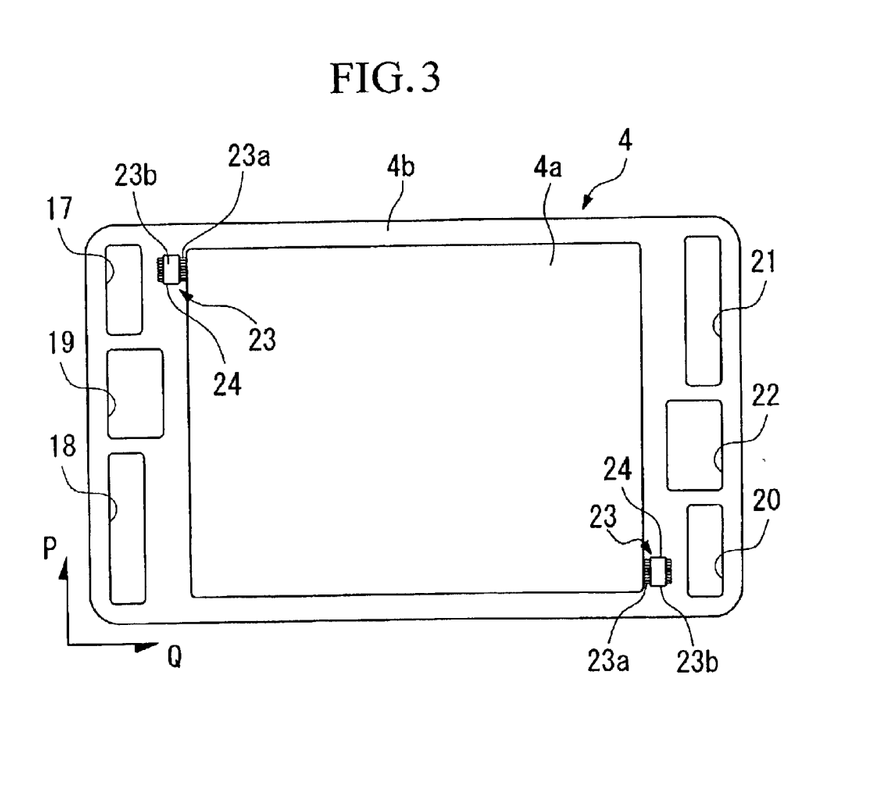
FIG. 3 is a plan view showing one separator forming the fuel cell unit shown in FIG. 1.
Figure 4:
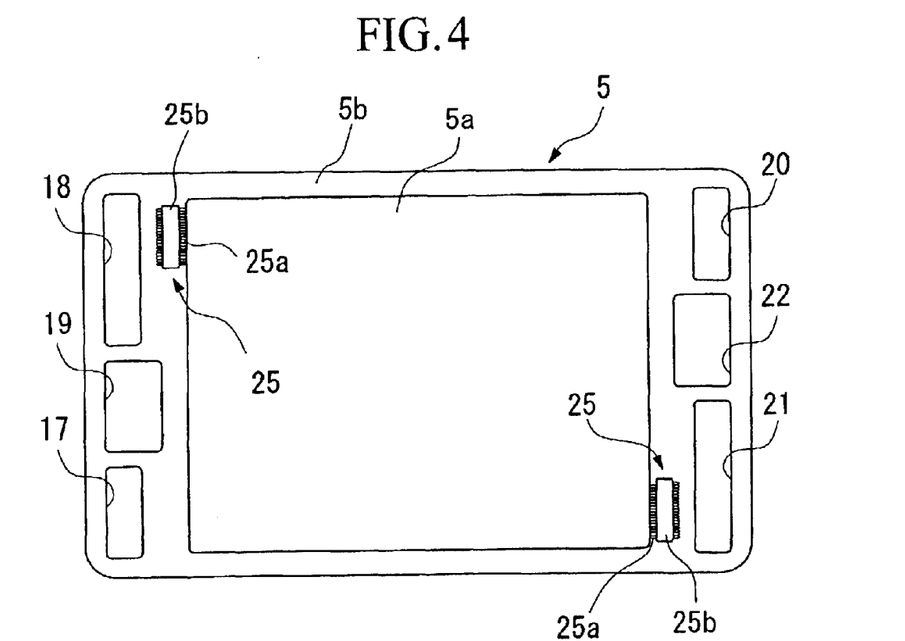
FIG. 4 is a plan view showing another separator forming the fuel cell unit shown in FIG. 1.

As is shown in FIGS. 3 and 4, the cooling medium supply hole 19 and the cooling medium discharge hole 22 are located substantially in the center in the transverse direction of the separators 4 and 5 (i.e., the direction indicated by the arrow P in FIG. 3). The fuel gas supply hole 17 and the oxidizing gas supply hole 18 are located at both sides in the transverse direction of the separators 4 and 5 sandwiching the cooling medium supply hole 19. The fuel gas discharge hole 20 and the oxidizing gas discharge hole 21 are located at both sides in the transverse direction of the separators 4 and 5 sandwiching the cooling medium discharge hole 22. The fuel gas discharge hole 20 and the oxidizing gas discharge hole 21 are located at diagonally opposite positions respectively to the fuel gas supply hole 17 and the oxidizing gas supply hole 18.

The lengths of the fuel gas supply hole 17 and discharge hole 20 and the lengths of the oxidizing gas supply hole 18 and discharge hole 21 along the longitudinal directions of the separators 4 and 5 (the direction indicated by the arrow Q in FIG. 3) are made to be shorter than the adjacent cooling medium supply hole 19 and discharge hole 22. As a result, the dimension of the gap from the fuel gas supply hole 17 and discharge hole 20 and the oxidizing gas supply hole 18 and discharge hole 21 to the corrugated sections 4a and 5a is made larger than the dimension of the gap from the cooling medium supply hole 19 and discharge hole 22 to the corrugated sections 4a and 5a.

As is shown in FIG. 3, between the fuel gas supply hole 17 and the corrugated section 4a and between the corrugated section 4a and the fuel gas discharge hole 20 on one surface of the separator 4 are formed communication passages 23 that respectively allow fuel gas supplied from the fuel gas supply hole 17 to pass to the corrugated section 4a, and fuel gas that has passed into the corrugated section 4a to be discharged from the fuel gas discharge hole 20. The communication passages 23 are provided with a plurality of grooves 23a formed on one surface of a separator and a flat bridge plate 23b that extends right across the grooves 23a. On the surface of the separator 4 where the bridge plate 23b is placed is formed a concave section 24 into which the bridge plate 23b is fitted. This concave section 24 enables the surface of the bridge plate 23b to be placed within the same planar surface as the planar section 4b of the separator 4 with no difference in level.

As is shown in FIG. 4, in the same way as for the separator 4a, communication passages 25 formed by a plurality of grooves 25a and a bridge plate 25b are also provided between the oxidizing gas supply hole 18 and the corrugated section 5a, and between the corrugated section 5a and the oxidizing gas discharge hole 21 on one surface of the other separator 5.

Figure 5:
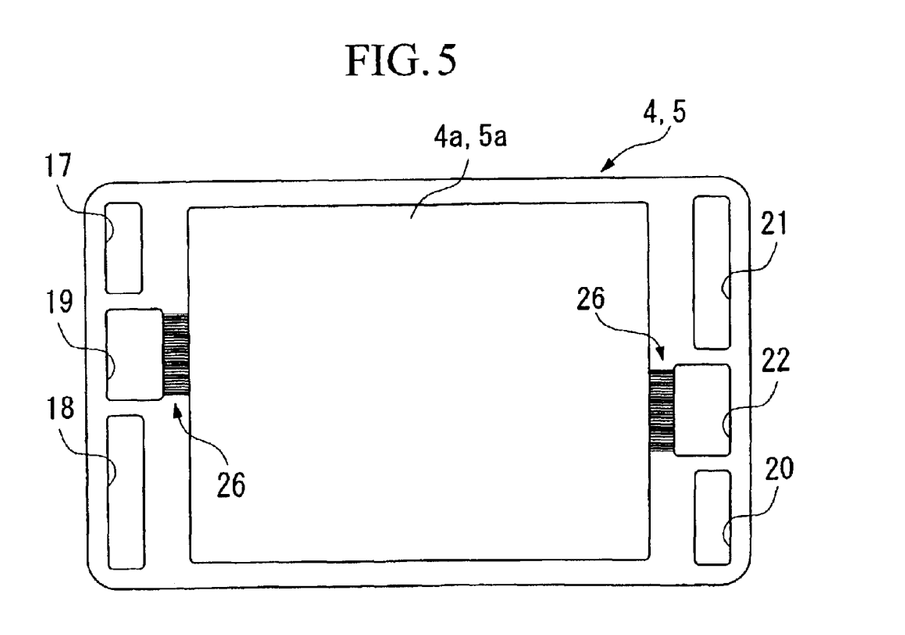
FIG. 5 is a plan view showing the rear surface of the separators shown in FIGS. 3 and 4.

As is shown in FIG. 5, on the other sides of the separators 4 and 5 are provided a communication passage 26 that connects the cooling medium supply hole 19 to the corrugated sections 4a and 5a, and a communication passage 26 that connects the corrugated sections 4a and 5a to the cooling medium discharge hole 22.

Figure 6:
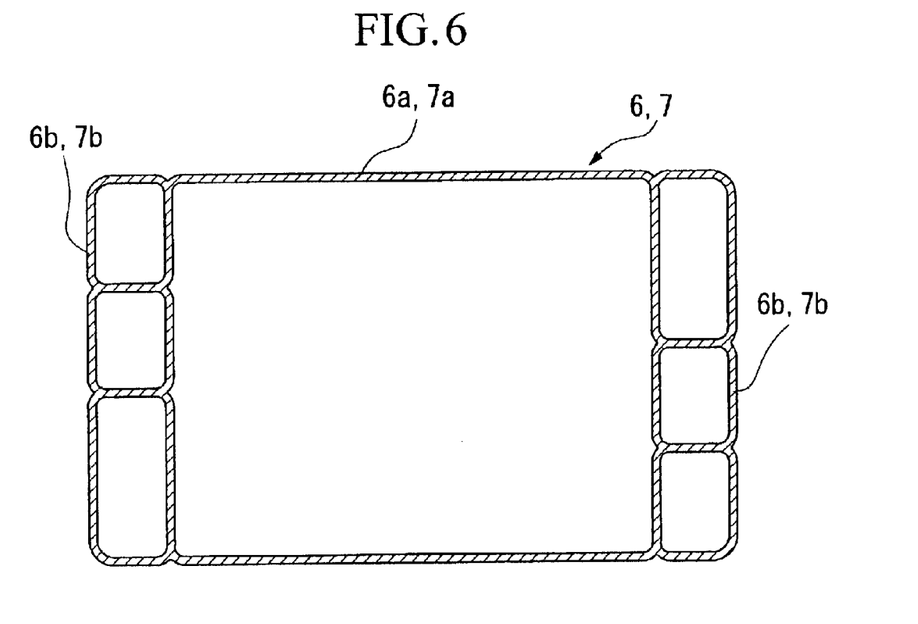
FIG. 6 is a plan view showing the gas sealing member forming the fuel cell unit shown in FIG. 1.

As is shown in FIG. 6, the gas sealing members 6 and 7 are formed integrally in a configuration that has a plurality of sub annular sections 6b and 7b that encircle each of the supply holes 17 to 19 and discharge holes 20 and 22 on both sides of main annular sections 6a and 7a that encircle the outer peripheries of the corrugated sections 4a and 5a.

Figure 7:
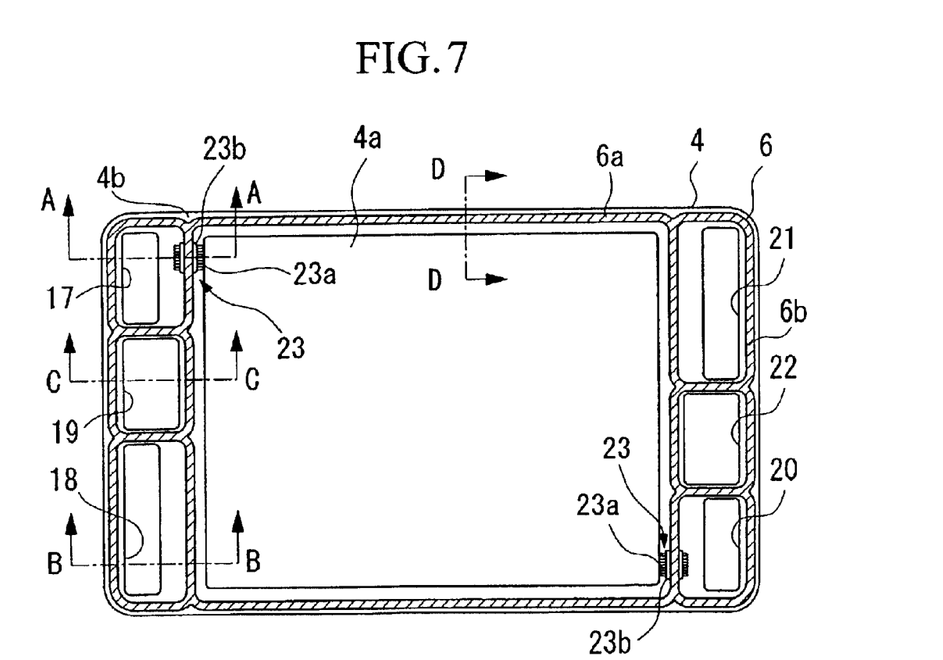
FIG. 7 is a plan view showing a state in which the gas sealing member shown in FIG. 6 is placed on the separator shown in FIG. 3.
Figure 8:
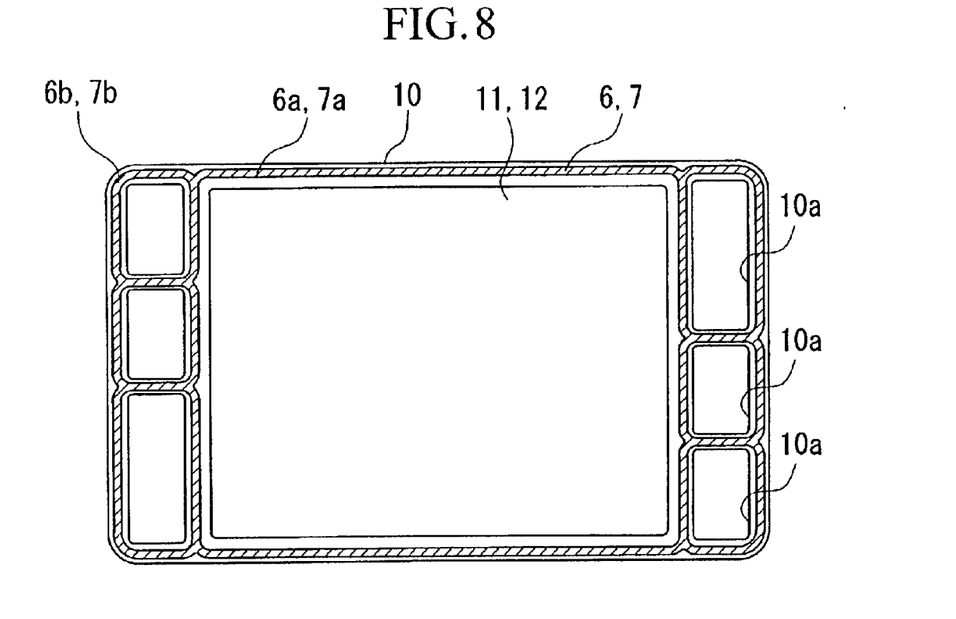
FIG. 8 is a plan view showing a state in which the gas sealing member shown in FIG. 6 is placed on the electrode assembly shown in FIG. 2.
Figure 9:
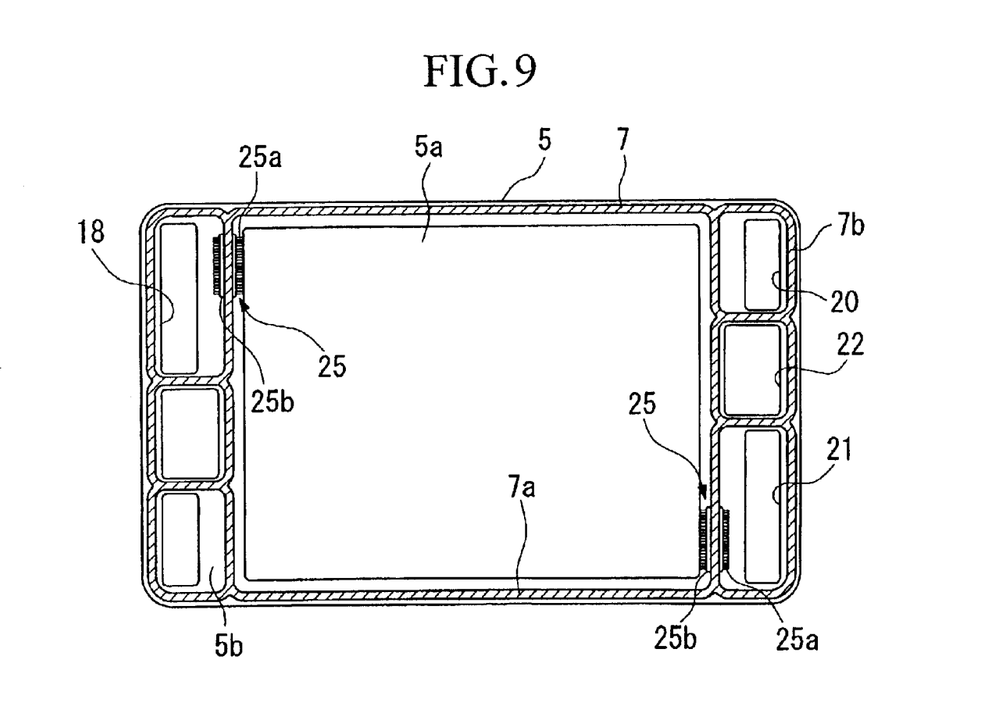
FIG. 9 is a plan view showing a state in which the gas sealing member shown in FIG. 6 is placed on the separator shown in FIG. 4.

FIGS. 7 to 9 show respectively a state in which these sealing members 6 and 7 are placed on one surface of the one separator 4, on one surface of the electrode assembly 3, and on one surface of the other separator 5.

As seen in FIGS. 7 to 9, the main annular sections 6a and 7a of the gas sealing members 6 and 7 are positioned so as to pass through the planar sections 4b and 5b between the respective supply holes 17 to 19 and discharge holes 20 to 22 and the corrugated sections 4a and 5a. As a result, the main annular sections 6a and 7a pass over the top of the bridge plates 23b and 25b provided in the communication passages 23 and 25, and the respective supply holes 17 to 19 and discharge holes 20 to 22 are only connected with the corrugated sections 4a and 5a by the grooves 23a and 25a forming the communication passages 23 and 25. The remaining sections are sealed in a fluid-tight state.

Figure 10:
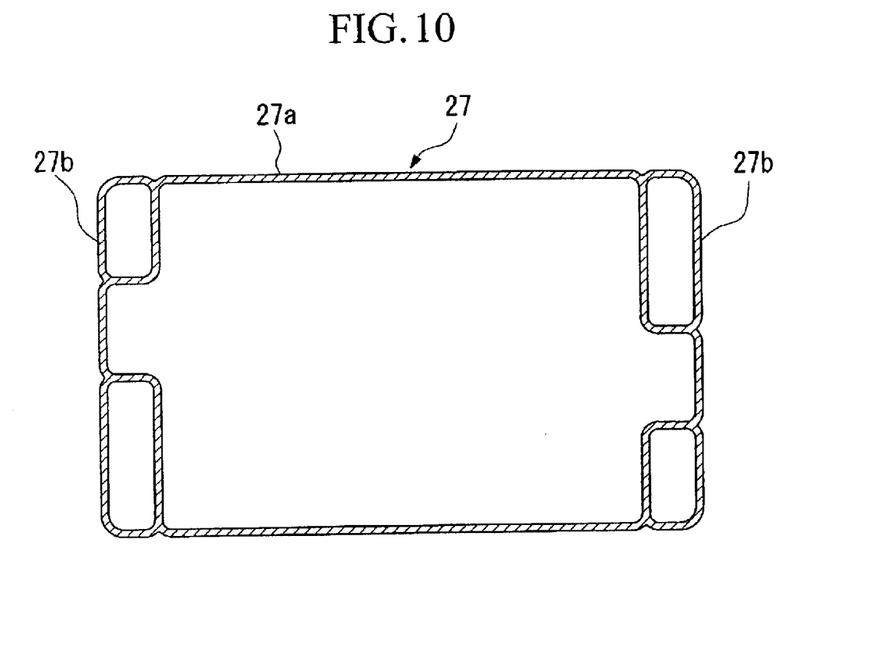
FIG. 10 is a plan view showing the cooling surface sealing member forming the fuel cell shown in FIG. 1.

As is shown in FIG. 12, a plurality of fuel cell units 2 that are formed in this manner are stacked with cooling surface sealing members 27 interposed between each fuel cell unit 2. As is shown in FIG. 10, the cooling surface sealing member 27 has a structure in which the main annular section 27a is joined integrally to the sub annular sections 27b.

Figure 11:
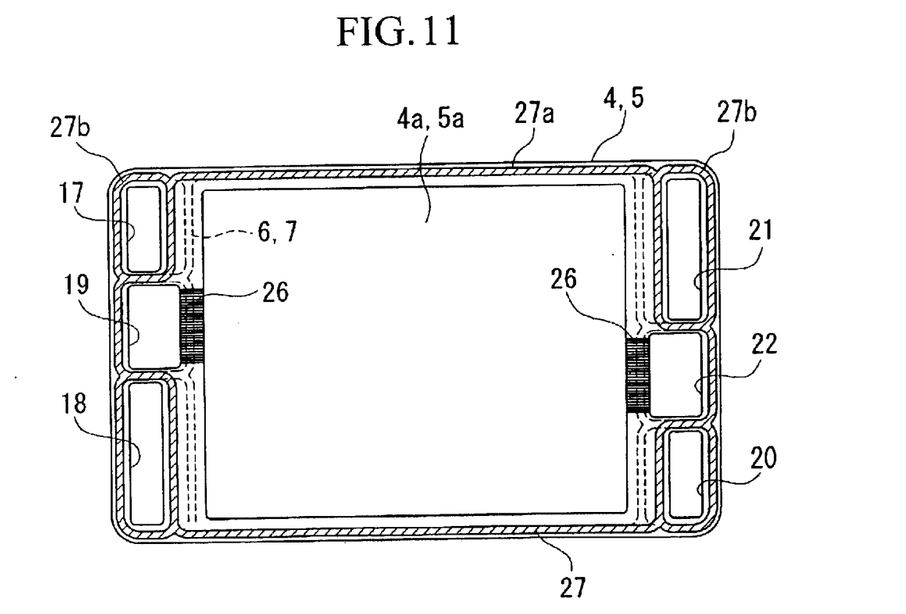
FIG. 11 is a plan view showing a state in which the cooling surface sealing member shown in FIG. 10 is placed on the separator shown in FIG. 5.

A state in which this cooling surface sealing member 27 is placed on the other surface sides of both separators 4 and 5 is shown in FIG. 11.

As is shown here, the main annular section 27a of the cooling surface sealing member 27 passes between the supply holes 17 and 18 of the fuel gas and oxidizing gas and the corrugated sections 4a and 5a, and also between the discharge holes 20 and 21 and the corrugated sections 4a and 5a, and seals the periphery of the cooling medium communication passage 28 that connects the cooling medium supply hole 19 to the corrugated sections 4a and 5a via the communication passage 26, and connects the corrugated sections 4a and 5a to the cooling medium discharge hole 22 via the communication passage 26. Moreover, the sub annular sections 27b of the cooling surface sealing section 27 independently seal each of the fuel gas and oxidizing gas supply holes 17 and 18 and discharge holes 20 and 21.

If the portions of the main annular section 27a of the cooling surface sealing member 27 that pass between the supply holes 17 and 18 of the fuel gas and oxidizing gas and the corrugated sections 4a and 5a, and also between the discharge holes 20 and 21 and the corrugated sections 4a and 5a are compared with the positions where the main annular sections 6a and 7a of the above described gas sealing member pass through (as shown by the broken line), then it can be seen that these portions of the main annular section 27a are shifted in position so that they pass positions closer to the supply holes 17 and 18 or to the discharge holes 20 and 21.

Cross sections of respective sections of a fuel cell 1 that is structured in this manner are shown in FIGS. 12 to 15. These drawings simply show cross sections; the broken lines in the drawings are shown to the left and right and are intended to show that the members are continuous.

FIG. 12 is a vertical cross section taken along the line A—A in FIG. 7. In FIG. 12 is shown a passage that supplies fuel gas from the fuel gas supply hole 17 that penetrates each of the separators 4 and 5 in the thickness direction thereof via the communication passage 23 to the fuel gas communication passage 8 formed between the anode electrode 11 and the separator 4.

As seen in FIG. 12, the gas sealing members 6 and 7 that seal the area between the electrode assembly 3 and the pair of separators 4 and 5 placed on either side thereof are placed sandwiching the electrolyte membrane 10 in the thickness direction thereof at a position opposite the stacking direction of the fuel cell unit 2. The gas sealing member 6 of the fuel gas communication passage is placed on a bridge plate 23b that extends right across the communication passage 23 formed in the separator 4. Namely, the communication passage 23 detours around the gas sealing member 6 in the thickness direction of the separator 4, and connects the interior of the gas sealing member 6 with the exterior thereof. As a result, fuel gas that is supplied from the fuel gas supply hole 17 on the exterior side of the gas sealing member 6 is able to pass into the fuel gas communication passage 8 on the interior side of the gas sealing member 6.

In this case, the cooling surface sealing member 27 that seals off each fuel cell unit 2 and delimits the cooling medium communication passage 28 is placed at a position that is shifted towards the fuel gas supply hole 17 side relative to the communication passage 23 where the gas sealing members 6 and 7 are provided. As a result, the cooling surface sealing member 27 is able to be placed at a superimposed position in the thickness direction of the separator 4 of the grooves 23a forming the communication passage 23 that are made by carving out one surface of the separator 4 in the thickness direction thereof.

The above description is for the fuel gas supply hole 17, however, the same description also applies in the case of the fuel gas discharge hole 20.

Figure 13:
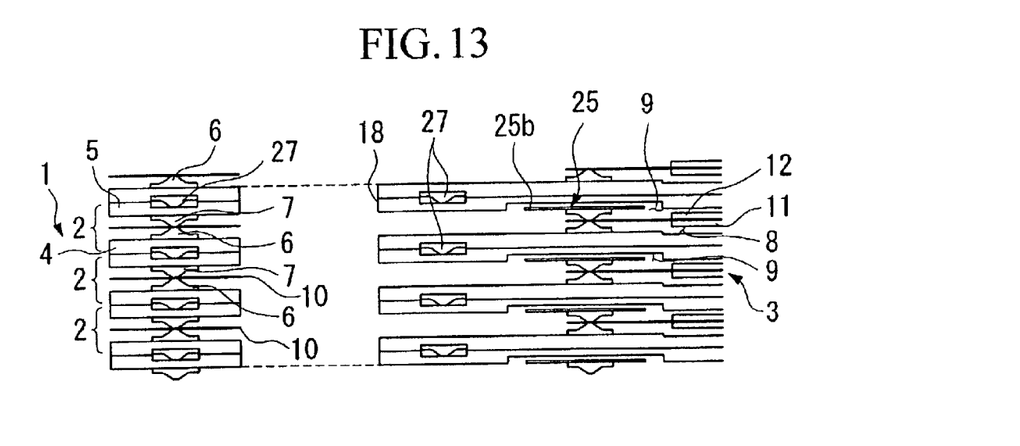
FIG. 13 is a vertical cross-section taken along the line B—B in FIG. 7 showing the fuel cell shown in FIG. 1.

FIG. 13 is a vertical cross section taken along the line B—B in FIG. 7. In FIG. 13 is shown a passage that supplies oxidizing gas from the oxidizing gas supply hole 18 that penetrates each of the separators 4 and 5 in the thickness direction thereof via the communication passage 25 to the oxidizing gas communication passage 9 formed between the cathode electrode 12 and the separator 5.

As seen in FIG. 13, the gas sealing members 6 and 7 that seal the space between the electrode assembly 3 and the pair of separators 4 and 5 placed on either side thereof are placed sandwiching the electrolyte membrane 10 in the thickness direction thereof at a position opposite the stacking direction of the fuel cell unit 2. The gas sealing member 7 is placed on a bridge plate 25b that extends right across the communication passage 25 formed in the separator 5. Namely, the communication passage 25 detours around the gas sealing member 7 in the thickness direction of the separator 5, and connects the interior of the gas sealing member 7 with the exterior thereof. As a result, oxidizing gas that is supplied from the oxidizing gas supply hole 18 on the exterior side of the gas sealing member 7 is able to pass into the oxidizing gas communication passage 9 on the interior side of the gas sealing member 7.

In this case, the cooling surface sealing member 27 that seals off each fuel cell unit 2 and delimits the cooling medium communication passage 28 is placed at a position that is shifted closer to the oxidizing gas supply hole 18 side than the communication passage 25 where the gas sealing member 7 is provided. As a result, the cooling surface sealing member 27 is able to be placed at a superposed position in the thickness direction of the grooves 25a of the communication passage 25 that are made by carving out one surface of the separator 5 in the thickness direction thereof.

The above description also applies in the case of the oxidizing gas discharge hole 21.

Accordingly, it is possible to greatly reduce the height of the fuel cell 1 by lowering the height of the cooling surface sealing member 27 that is needed for the cooling surface sealing member 27 to be able to provide a sufficient sealing ability, while at the same time maintaining the thickness of the separators 4 and 5 at the positions where the communication passages 23 and 25 are formed.

Figure 14:
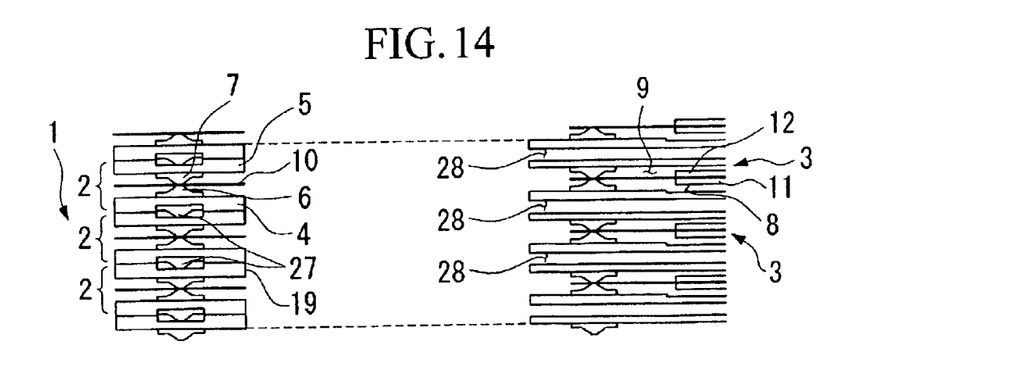
FIG. 14 is a vertical cross-section taken along the line C—C in FIG. 7 showing the fuel cell shown in FIG. 1.
Figure 15:
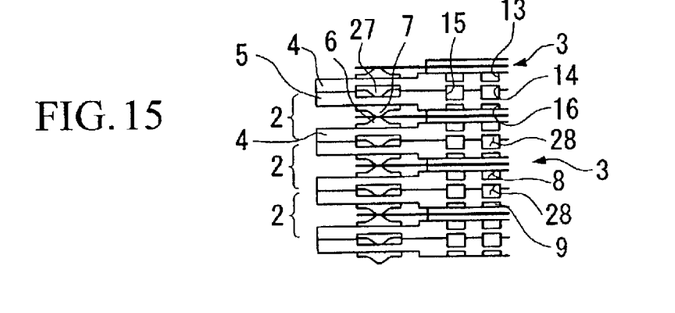
FIG. 15 is a vertical cross-section taken along the line D—D in FIG. 7 showing the fuel cell shown in FIG. 1.

FIGS. 14 and 15 are vertical cross sections taken respectively along the lines C—C and D—D in FIG. 7. In these drawings are shown a cooling medium passage that connects the cooling medium supply hole 19 to the cooling medium communication passage 28 delimited by adjacent fuel cell units 2, as well as the fuel gas communication passage 8, oxidizing gas communication passage 9, and cooling medium communication passage 28 that are delimited by the corrugated sections 4a and 5a.

Next, a description will be given of the fuel cell 30 according to the second embodiment of the present invention while referring to FIGS. 16 and 17. Note that, in the present embodiment, the same descriptive symbols as are used in the first embodiment are given to structural elements that are in common with the structure of the first embodiment, and a description thereof is here omitted.

Figure 16:
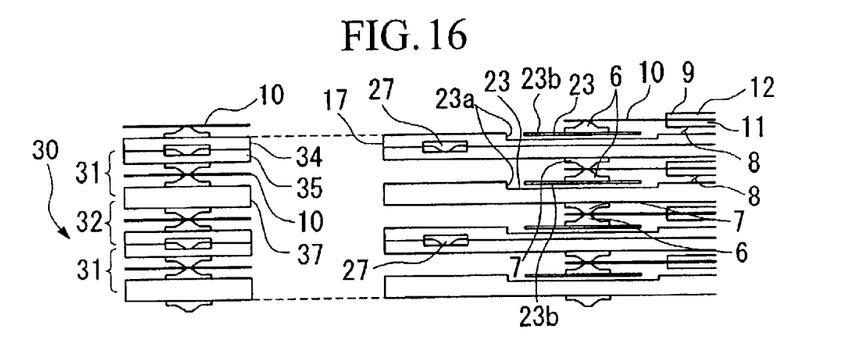
FIG. 16 is a vertical cross-sectional view similar to that in FIG. 12 showing the fuel cell according to the second embodiment of the present invention.
Figure 17:
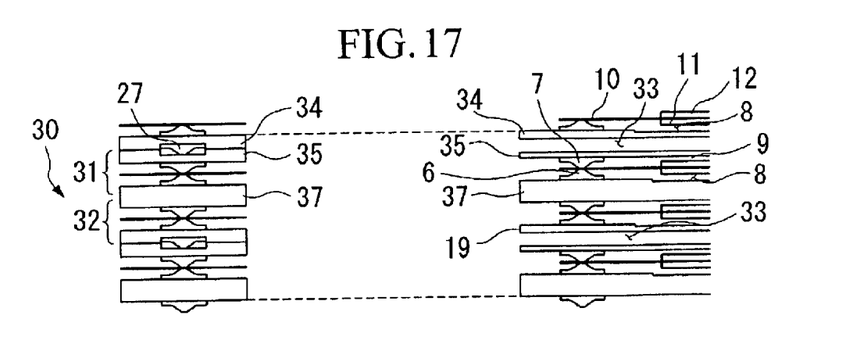
FIG. 17 is a vertical cross-sectional view similar to that in FIG. 14 showing the fuel cell shown in FIG. 16.

FIGS. 16 and 17 are vertical cross-sectional views corresponding respectively to FIGS. 12 and 14 of the first embodiment.

The fuel cell 30 according to the present embodiment varies from the fuel cell 1 of the first embodiment in that, while in the fuel cell 1 according to the first embodiment a cooling medium communication passage 28 is formed between fuel cell units 2, in the present embodiment a single cooling medium communication passage 33 is formed for every two fuel cell units 31 and 32. Namely, in those portions where the cooling medium communication passage 33 is formed, in the same way as for the fuel cell 1 according to the first embodiment, as is shown in FIG. 17, the cooling medium communication passage 33 is formed by placing two separators 34 and 35 facing each other with a cooling surface sealing member 27 sandwiched between them. However, in those portions where the cooling medium communication passage 33 is not formed, a single separator 37 formed by integrating the separators 6 and 7 of the first embodiment is used.

In the same way as for the fuel cell 1 according to the first embodiment, the gas sealing members 6 and 7 of a fuel cell 30 according to the present embodiment that seal the space between the electrode assembly 3 and the pair of separators 34 and 37 (or the separators 35 and 37) placed on either side thereof are placed sandwiching the electrolyte membrane 10 in the thickness direction thereof at a position opposite the stacking direction of the fuel cell units 31 and 32. The gas sealing member 6 of the fuel gas communication passage 8 is placed on a bridge plate 23b that extends right across the communication passage 23 formed in the separators 34 and 37. As a result, the communication passage 23 detours around the gas sealing member 6 in the thickness direction of the separators 34 and 37, and connects the interior of the gas sealing member 6 with the exterior thereof. As a result, fuel gas that is supplied from the fuel gas supply hole 17 on the exterior side of the gas sealing member 6 is able to pass into the fuel gas communication passage 8 on the interior side of the gas sealing member 6. The same applies to the oxidizing gas communication passage 9 side.

The cooling surface sealing member 27 that delimits the cooling medium communication passage 33 is placed at a position that is shifted closer to the fuel gas supply hole 17 side than the communication passage 23 where the gas sealing members 6 and 7 are provided. As a result, in the same way as in the first embodiment, the grooves 23*a* forming the communication passage 23 that are made by carving out one surface of the separators 34 and 37 in the thickness direction thereof are able to be placed at a superimposed position in the thickness direction of the separators 34 and 37 relative to the cooling surface sealing member 27. Therefore, it is possible to achieve the fuel cell 30 that greatly reduces the height thereof.

By providing a cooling medium communication passage 33 for every two fuel cell units 31 and 32, it is possible to achieve a cost reduction by reducing the quantity of the cooling surface sealing member 27. In addition, by reducing the thickness of the integral separator 37 where the cooling medium communication passage 33 is not formed, it becomes possible to reduce the height of the fuel cell 30 even further.

Figure 18:
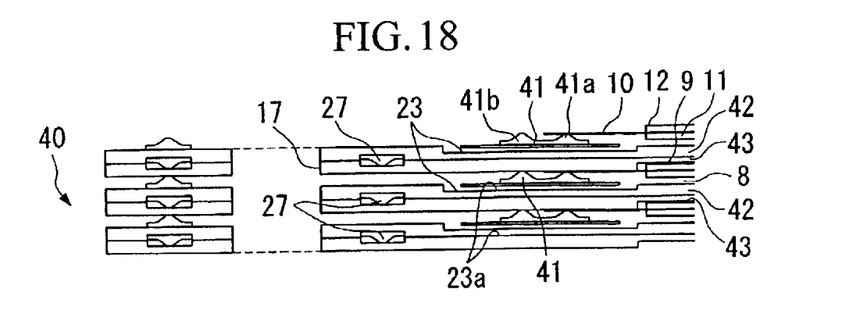
FIG. 18 is a vertical cross-sectional view similar to that in FIG. 12 showing the fuel cell according to the third embodiment of the present invention.
Figure 19:
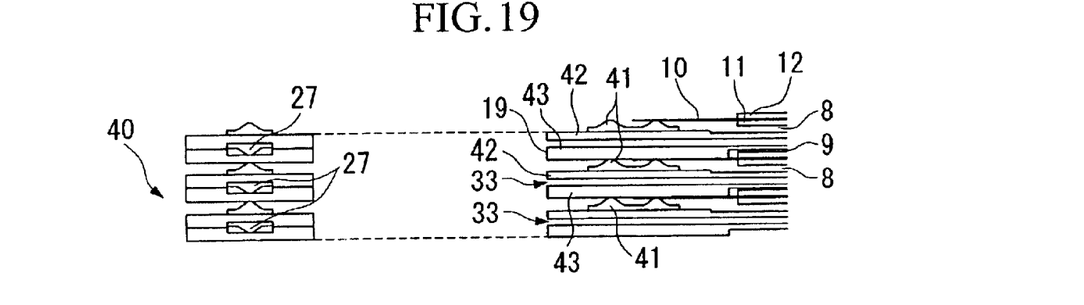
FIG. 19 is a vertical cross-sectional view similar to that in FIG. 14 showing the fuel cell shown in FIG. 18.

Next, the fuel cell 40 according to the third embodiment of the present invention will be described while referring to FIGS. 18 and 19. FIGS. 18 and 19 are vertical cross-sectional views corresponding respectively to FIGS. 12 and 14 of the first embodiment.

The fuel cell 40 according to the present embodiment varies from the fuel cell 1 of the first embodiment in the structure of the gas sealing member 41.

Instead of the pair of gas sealing members 6 and 7 that sandwich the electrolyte membrane 10 of the first embodiment from both sides, the gas sealing member 41 of the present embodiment employs a double gas sealing member 41 that is provided with an inner side sealing section 41*a* that seals the space between the electrolyte membrane 10 and the separator 42 provided on one surface of the electrolyte membrane 10, and with an outer side sealing section 41*b* that is located on the outer side of the electrolyte membrane 10 and seals the space between the pair of opposing separators 42 and 43.

In the fuel cell 40 according to the present embodiment as well, the communication passage 23 that detours around the gas sealing member 41 in the thickness direction of the separator 42, and connects the interior of the gas sealing member 41 with the exterior thereof. As a result, fuel gas that is supplied from the fuel gas supply hole 17 on the outer side of the gas sealing member 41 is able to pass into the fuel gas communication passage 8 on the inner side of the gas sealing member 41. By placing the cooling surface sealing member 27 at a position that is shifted closer to the fuel gas supply hole 17 side than the communication passage 23 where the gas sealing member 41 is provided, in the same way as in the above embodiments, the grooves 23*a* forming the communication passage 23 are able to be placed at a superimposed position in the thickness direction of the separators 42 and 43 relative to the cooling surface sealing member 27. Therefore, it is possible to achieve the fuel cell 40 that greatly reduces the height thereof.

Moreover, by using this double gas sealing member 41, in the same way as for the gas sealing members 6 and 7 of the first and second embodiments, not only is it possible to reliably seal the gas communication passages 8 and 9 formed on both sides of the electrolyte membrane 10, but by placing the gas sealing member 41 on one side of the electrolyte membrane 10 it is possible to reduce the space occupied by the gas sealing member 41 and lower the height of the fuel cell 40.

Note that it is also possible in the fuel cell 40 according to the third embodiment to employ the structure shown in the second embodiment in which the cooling medium communication passage 33 is provided for every two cells. In this case, the height reduction effect of the fuel cell 30 according to the second embodiment is added to the height reduction effect obtained by thinning the cooling medium communication passage 33 so as to achieve an even greater reduction in size.

Figure 20:
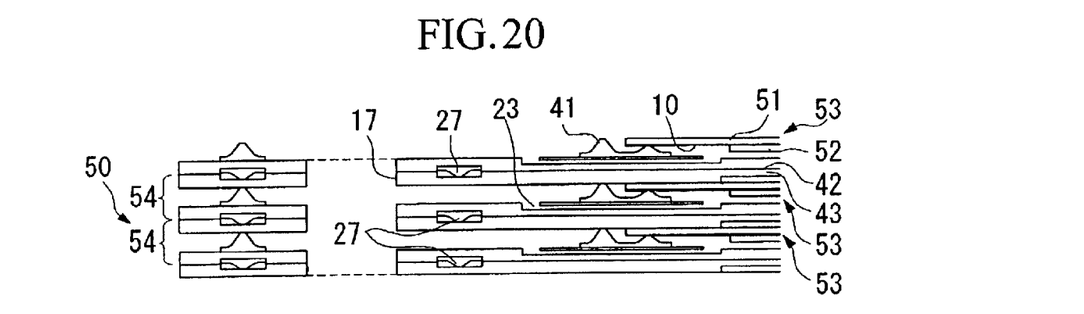
FIG. 20 is a vertical cross-sectional view similar to that in FIG. 12 showing the fuel cell according to the fourth embodiment of the present invention.
Figure 21:
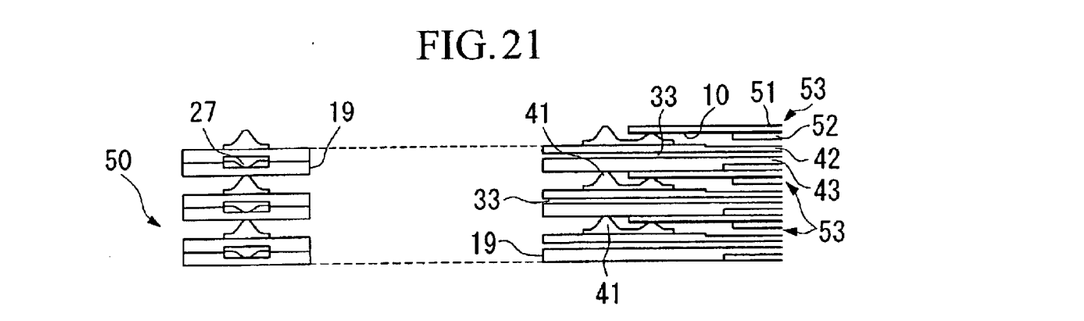
FIG. 21 is a vertical cross-sectional view similar to that in FIG. 14 showing the fuel cell shown in FIG. 20.

Next, the fuel cell 50 according to the fourth embodiment of the present invention will be described while referring to FIGS. 20 and 21. FIGS. 20 and 21 are vertical cross-sectional views corresponding respectively to FIGS. 18 and 19 of the third embodiment.

As is shown in FIG. 18, the fuel cell 50 according to the present embodiment varies from the fuel cell 40 of the above described embodiment in that, instead of the electrode assembly 3 of the fuel cell 40 according to the third embodiment in which electrodes 11 and 12 having the same size are placed on either side of the electrolyte membrane 10, a stepped electrode assembly 53 is employed in which one electrode 51 is made larger than the other electrode 52, and one entire surface of the electrolyte membrane 10 is covered by the large electrode 51.

In the fuel cell 50 according to the present embodiment as well, the communication passage 23 that detours around the gas sealing member 41 in the stacking direction of the fuel cell units 54, and connects the interior of the gas sealing member 41 with the exterior thereof is provided. Moreover, the cooling surface sealing member 27 is provided at a position that is shifted towards the fuel gas supply hole 17 relative to the communication passage 23. Therefore, it is possible to reduce the height of the fuel cell 50 by placing the cooling surface sealing member 27 and the communication passage 23 at superimposing positions in the thickness direction of the separator 42.

Note that it is also possible in the fuel cell 50 according to the present embodiment to employ the structure described in the second embodiment in which the cooling medium communication passage 33 is provided for every two cells.

Figure 22:
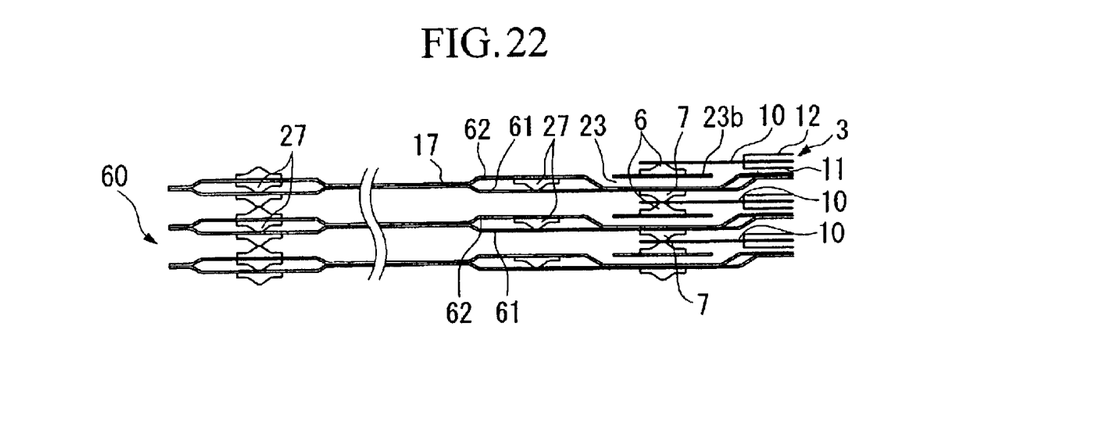
FIG. 22 is a vertical cross-sectional view similar to that in FIG. 12 showing the fuel cell according to the fifth embodiment of the present invention.
Figure 23:
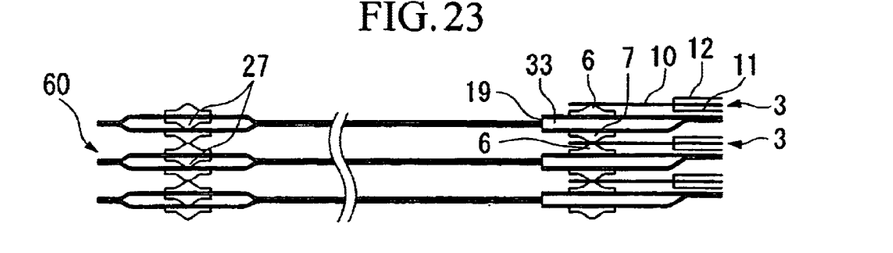
FIG. 23 is a vertical cross-sectional view similar to that in FIG. 14 showing the fuel cell shown in FIG. 22.

Next, the fuel cell 60 according to the fifth embodiment of the present invention will be described while referring to FIGS. 22 and 23.

The fuel cell 60 according to the present embodiment differs from the fuel cells 1, 30, 40, and 50 according to the first through fourth embodiments in which carbon separators are employed in that separators 61 and 62 that are formed in a corrugated shape by press working a thin metal plate are used.

In the fuel cell 60 according to the present embodiment as well, a structure is employed in which the communication passage 23 is formed by bending the separator 62 in a direction in which the gap between the separator 62 and the gas sealing members 6 and 7 is increased at the positions of the gas members 6 and 7 that sandwich the electrolyte membrane 10 from both sides, and the gas sealing member 6 is supported by the bridge plate 23*b* that bridges the communication passage 23. Accordingly, the communication passage 23 detours around the gas sealing member 6 in the stacking direction of the separators 61 and 62, connects the interior side of the gas sealing member 6 with the exterior side thereof.

The cooling surface sealing section 27 is placed at a position that is shifted towards the fuel gas supply hole 17 from the communication passage 23. Therefore, the cooling surface sealing section 27 is placed at a position where it superposes the communication passage 23 in the stacking direction of the separators 61 and 62. As a result, the effect is achieved that it is possible to reduce the gap between the opposing separators 61 and 62, and the overall height of the fuel cell 60 can be lowered.

Note that in the above described fifth embodiment a description is given while referring to the drawings of a case that corresponds to the first embodiment when carbon separators are employed therein, however, in any one of cases such as are described for the second through fourth embodiments, namely, a case in which the cooling medium communication passage 33 is provided for every two cells, a case in which a double gas sealing member 41 having an inner side sealing section 41a and an outer side sealing section 41b is used, and a case in which the stepped electrode assembly 53 in which the electrolyte membrane 10 is sandwiched by the different sized electrodes 51 and 52, it is possible to achieve the same effect using the metal separators 61 and 62.

What is claimed is:

1. A fuel cell formed by stacking a plurality of fuel cell units such that the fuel cell units sandwich cooling surface sealing members that seal a cooling medium communication passage formed between the fuel cell units, each fuel cell unit comprising:

an electrode assembly formed by disposing electrodes on both sides of an electrolyte;

a pair of separators that sandwich the electrode assembly in the thickness direction thereof; and a gas sealing member that is disposed at an outer peripheral portion of the electrode assembly, and that seals respective gas communication passages for reaction gases that are formed between each separator and the electrode assembly and are bounded by the separators and the electrode assembly, wherein in each of the separators, there are provided communication holes for the reaction gases and the cooling medium that penetrate the separators in the thickness direction thereof to the outer side of the gas sealing member, and a communication passage that detours around the gas sealing member in the thickness direction of the separators and connect the reaction gas communication hole with the gas communication passage; and the cooling surface sealing member that seals off the cooling medium communication passage from the reaction gas communication hole is provided at a position that is shifted from the communication passage towards the communication hole.

2. The fuel cell according to claim 1, wherein, in areas other than the vicinity of the communication passage, the cooling surface sealing member is placed at substantially the same position as the gas sealing member as seen from a stacking direction.

3. The fuel cell according to claim 1, wherein each communication passage is provided with a plurality of grooves formed on one surface of a separator and a flat bridge plate that extends right across the grooves.

4. The fuel cell according to claim 3, wherein a concave section into which the bridge plate is fitted is formed on the surface of the separator where the bridge plate is placed, and the surface of the bridge plate is placed within the same planar surface as a planar section of the separator with no difference in level.

5. The fuel cell according to claim 3, wherein the bridge plate is placed at a superposed position with respect to the gas sealing member.

6. The fuel cell according to claim 1, wherein the cooling medium communication passage is provided for each fuel cell unit.

7. The fuel cell according to claim 1, wherein each cooling medium communication passage is provided for a plurality of fuel cell units.

8. The fuel cell according to claim 7, wherein a single separator is provided in each space between the fuel cell units where the cooling medium communication passage is not formed.

9. The fuel cell according to claim 1, wherein the gas sealing member is provided with an inner side sealing section that seals the space between the electrolyte and the separator provided on one surface of the electrolyte, and with an outer side sealing section that is located on the outer side of the electrolyte and seals the space between the pair of separators.

10. The fuel cell according to claim 9, wherein the inner side sealing section and the outer side sealing section is provided on one side of the electrolyte.

11. The fuel cell according to claim 1, wherein the electrode assembly is a stepped electrode assembly in which one electrode is made larger than the other electrode, and one entire surface of the electrolyte is covered by the one electrode.

12. The fuel cell according to claim 1, wherein each separator is formed in a corrugated shape by press working a thin metal plate.

* * * * *